United States Patent [19]

Nekut, Jr.

[11] Patent Number: 4,663,593
[45] Date of Patent: May 5, 1987

[54] METHOD OF ELECTROMAGNETIC EXPLORATION

[75] Inventor: Anthony G. Nekut, Jr., Tulsa, Okla.

[73] Assignee: Standard Oil Company, Chicago, Ill.

[21] Appl. No.: 712,575

[22] Filed: Mar. 15, 1985

[51] Int. Cl.[4] .............................................. G01V 3/08
[52] U.S. Cl. ................................... 324/345; 324/348
[58] Field of Search ............... 324/345, 347, 348, 349, 324/350

[56] References Cited

U.S. PATENT DOCUMENTS 4,349,781  9/1982  Vozoff ........................... 324/350 X
4,473,800  9/1984  Warner .............................. 324/349

OTHER PUBLICATIONS

A. F. Kuckes, "Relations Between Electrical Conductivity of a Mantle and Fluctuating Magnetic Fields", Geophysical J. R. Astr. Soc., 32, 1973, pp. 119-131.

I. Abramovici, "The Forward Magnetotelluric Problem for an Inhomogeneous and Anisotropic Structure", Geophysics, vol. 39, No. 1, Feb. 1974, pp. 56-68.

J. F. Hermance et al, "The Telluric-Magnetotelluric Method", Geophysics, vol. 40, No. 4, Aug. 1975, pp. 664-668.

F. E. M. Lilley et al, "On Estimating Electrical Conductivity Using Gradient Data from Magnetometer Arrays", Journal Geomag. Geoelectr., 28, 1976, pp. 321-328.

J. Clarke et al, "SQUIDS and Magnetotelluric with a Remote Reference", American Inst. of Physics Conf. Proc., No. 44, 1978, pp. 87-94.

A. D. Richmond et al, "Three Dimensional Analysis of Magnetometer Array Data", Journal of Geophysics, 54, 1983, pp. 135-136.

T. D. Gamble, "Magnetotellurics with a Remote Magnetic Reference, Geophysics, vol. 44, No. 1, Jan. 1979, pp. 53-68.

Primary Examiner—Reinhard J. Eisenzopf
Assistant Examiner—Robert W. Mueller
Attorney, Agent, or Firm—Timothy D. Stanley

[57] ABSTRACT

A method of electromagnetic geophysical exploration of the earth's subterranean formations wherein an array of magnetometers are deployed at reference sites to obtain a measure of horizontal components of the earth's electromagnetic field and magnetometers are simultaneously deployed at a plurality of exploratory sites within a region of interest to obtain a measure of the vertical component of the earth's electromagnetic field. Resultant correlations of the horizontal and vertical components of the electromagnetic field can provide a multidimensional representation of the earth's resistivity structure.

13 Claims, 6 Drawing Figures

FIG.1

WHERE: $r_4 \neq r_1 \neq r_2 \neq r_3$

METHOD OF ELECTROMAGNETIC EXPLORATION

BACKGROUND IN THE INVENTION

The present invention relates generally to a novel method of electromagnetic geophysical exploration to obtain a representation of the earth's resistivity structure.

In geophysical exploration, several techniques have been developed to ascertain the nature of the earth's subterranean formations. Of these techniques, seismic exploration is the most commonly used, while magnetotelluric, magnetic, and gravity exploration have also proven to be advantageous in selected situations. The traditional approach of geophysical exploration in virgin areas has been to employ gravimetric and magnetic surveys, as well as magnetotelluric surveys, if the earth's subterranean formations have significant differences in electrical conductivity.

In particular, the magnetotelluric geophysical exploration technique obtains a measure of horizontal components of the earth's electrical field and horizontal components of the earth's magnetic field induced in the earth by naturally-occurring fluctuations caused by such things as solar winds, solar flares, diurnal effects, etc. In magnetotelluric exploration, one simultaneously measures both the horizontal components of the electric field and the horizontal components of the magnetic field at a plurality of sites on the earth's surface. The measured horizontal components of the electric field $\vec{E}(\omega)$ and magnetic field $\vec{H}(\omega)$ are linearly related according to:

$$\vec{E}(\omega) = Z(\omega) \cdot \vec{H}(\omega) \qquad (1)$$

where $Z(\omega)$ is the magnetotelluric impedance tensor at the measurement site and $\omega$ is the angular frequency of the natural electric field $\vec{E}(\omega)$ fluctuation. In practice, the electric field $\vec{E}(\omega)$ and the magnetic field $\vec{H}(\omega)$ are determined by Fourier transformation of the measured time series $\vec{E}(t)$ and $\vec{H}(t)$. The impedance tensor $Z(\omega)$ is determined by the distribution of resistivities in the earth's subsurface. If the impedance tensor $Z(\omega)$ is determined at a sufficiently large number of sites in an exploration region, it is possible to uniquely determine the earth's subsurface resistivity distribution. The frequency $\omega$ of the detected electric $\vec{E}(\omega)$ and magnetic $\vec{H}(\omega)$ fields provides an indication of the depth to which the resistivity structure influences the impedance tensor $Z(\omega)$. Generally the depth of investigation increases with decreasing frequency $\omega$. In practice, the requisite number of impedance tensor $Z(\omega)$ measurements needed for a unique interpretation is rarely achieved and this leads to serious ambiguities in interpretation of magnetotelluric data.

Figure 1:
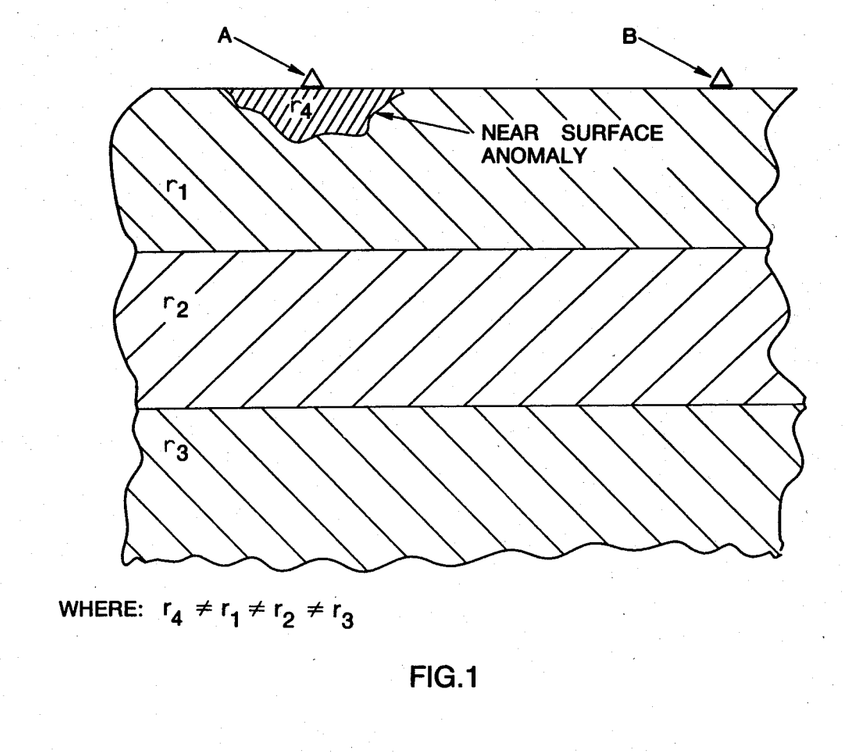
FIG. 1 is a cross-sectional view representation of earth structure with a near-surface anomaly.

By way of example, the earth can be considered to have a layered resistivity structure which varies with depth except for a small, near-surface anomaly $r_4$ in proximity to measurement site A as depicted in FIG. 1. The resistivity r of the various layers are $r_1 \neq r_2 \neq r_3 \neq r_4$. The near-surface anomaly $r_4$ is of no exploration interest in itself and the spacing between measurement sites as well as the range of frequencies $\omega$ to be measured are determined by the exploration depths which are of interest. Ideally, electromagnetic measurements made at two measurement sites A and B of FIG. 1 would determine the same basic depth varying resistivity structure. However, in FIG. 1, the electric field $\vec{E}(\omega)$ measurements made at site A will differ substantially from those made at site B due to the presence of the near-surface anomaly $r_4$. This difference will persist over the whole range of measurement frequencies. The effect of the near-surface anomaly $r_4$ is principally to distort the electric field $\vec{E}(\omega)$ around it; the magnetic field $\vec{H}(\omega)$ is not seriously affected by such near-surface anomalies. Such effects are commonly called "statics" and come into play any time near-surface current flow is significantly controlled by electrostatic electric fields.

The distortion in the measured electric field $\vec{E}(\omega)$ caused by near-surface anomalies can result in serious misinterpretation of the earth's resistivity structure using the data from site A. To ameliorate this problem with magnetotelluric measurements, it is necessary to increase the upper limit of measured frequencies $\omega$ and the number of measurement sites so that the structure of the near-surface anomaly can be identified and its effects removed. This remedy can be very costly, especially considering that the near-surface anomaly is of no intrinsic exploration interest. Warner U.S. Pat. No. 4,473,800 also discloses a magnetotelluric technique for resolving such near-surface anomalies.

Attempts have been made by others to obtain a measure of the earth's resistivity structure independent of electric field measurements which can be extremely sensitive to near-surface anomalies. Specifically, A. F. Kuckes in "Relations between Electrical Conductivity of a Mantle and Fluctuating Magnetic Fields," Geophysical J. R. astr. Soc. 32, p. 119-131 (1973) describes a technique wherein the in-phase and out-of-phase ratios of the vertical component of the magnetic field to a horizontal magnetic field gradient can be used to obtain a measure of a one-dimensional earth resistivity structure.

Additionally, F. E. M. Lilley, et al., in "On Estimating Electrical Conductivity Using Gradient Data from Magnetometer Arrays," J. Geomag. Geoelectr., 28, p. 321-328 (1976) refines the one-dimensional technique of Kuckes to reduce errors generated by locally-induced anomalous fields. Such one-dimensional techniques employing both the vertical component of the magnetic field and horizontal magnetic field gradients are generally unsatisfactory and incapable of adequately describing a two or three-dimensional earth resistivity structure.

More recently, A. D. Richmond, et al., in, "Three-Dimensional Analysis of Magnetometer Array Data," Journal of Geophysics, 54, p. 138-156 (1983) describes a technique for mapping magnetic field variations using data from an array of magnetometers based on optimal linear estimation. This method provides statistical estimates of a spatial auto-correlation function of magnetic field variations from which earth resistivity can be obtained.

To avoid problems associated with electric field distortions associated with magnetotelluric techniques, and to provide a more straightforward method for evaluating one-, two- and three-dimensional earth resistivity structures, the present invention discloses a technique for interpreting multidimensional earth resistivity structures based only on measurements of the magnetic field $\vec{H}(\omega)$. The magnetic field $\vec{H}(\omega)$ is determined by the spatial distribution of electric currents in the earth. At high frequencies $\omega$, when current flows at shallow depths in the earth, a near-surface anomaly can affect the magnetic field $\vec{H}(\omega)$. However, at lower frequencies, corresponding to depths of exploration interest, the bulk of induced current flow is deep in the earth, and only a small fraction of the total current flow is distorted by the anomaly. As a result, magnetic field $\vec{H}(\omega)$ measurements become decreasingly sensitive to near-surface anomalies as the frequency $\omega$ is reduced. This can be contrasted with the persistent distortion caused in the electric fields $\vec{E}(\omega)$ for all frequencies.

SUMMARY OF THE INVENTION

The present invention discloses a novel electromagnetic method for geophysical exploration of the earth's subterranean formations which avoids the near-surface anomaly problem associated with the magnetotelluric geophysical exploration technique. Representations of multidimensional earth resistivity structures can be obtained in accordance with the present invention.

In accordance with the present method of electromagnetic geophysical exploration, an array of magnetometers deployed at reference sites i within a region of interest obtain a measure of horizontal components of the earth's magnetic field, and concurrently a plurality of measurements of the vertical component of the earth's magnetic field are obtained by magnetometers at exploratory sites within the region of interest. By correlating the resultant measurements of the horizontal and vertical components of the earth's field, a representation of multidimensional earth resistivity structures can be obtained.

DESCRIPTION OF THE PREFERRED EMBODIMENT

Figure 2:
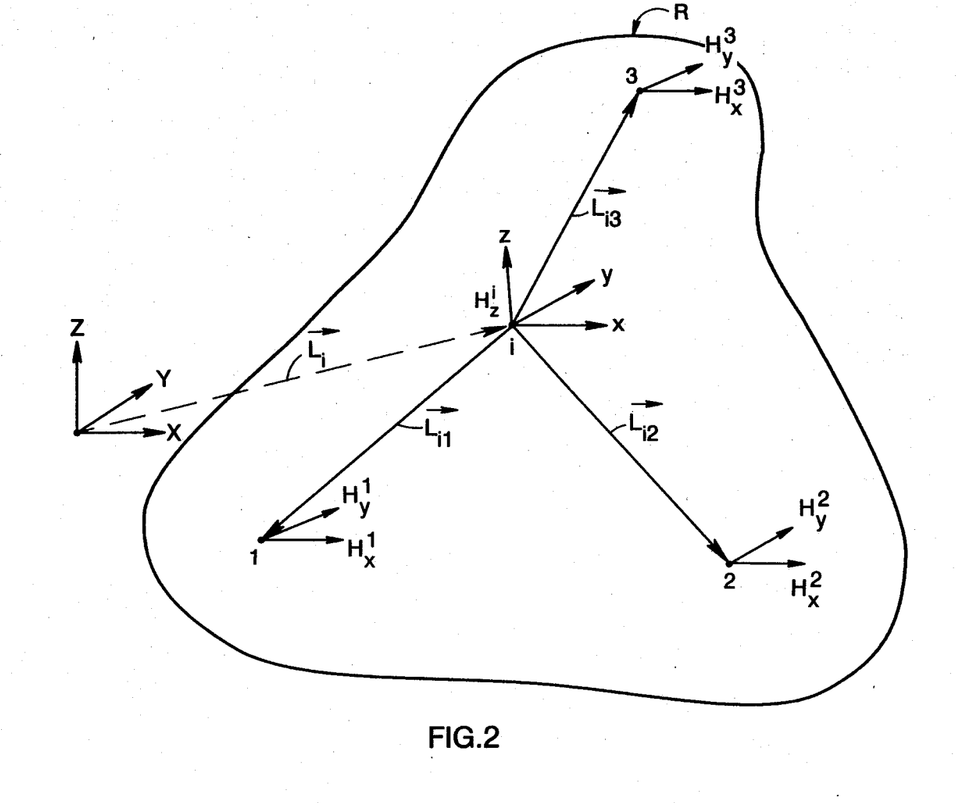
FIG. 2 is a representation of a magnetometer array of the preferred embodiment, in plan view.

Referring now to FIG. 2, the electromagnetic geophysical exploration technique of the present invention is depicted. An array of magnetometers are located at reference sites 1, 2 and 3 to obtain a measure of the orthogonal, horizontal components of the naturally occurring magnetic field, i.e., $H_x(t)$, $H_y(t)$ At exploratory site i, conveniently located at the origin of Cartesian coordinate system (x,y,z), a vertical component of the naturally occurring magnetic field $H_z(t)$ is measured. It is intended that the reference sites 1, 2, 3 remain essentially fixed while vertical magnetic field measurements are taken at a plurality of exploratory sites i within a region of interest R generally defined by the reference sites 1, 2, 3. The position of each exploratory site i is given by its coordinates $X_i$ and $Y_i$ with respect to a fixed Cartesian coordinate system (X, Y, Z). By further increasing the number of reference sites in the array, improved results can be obtained, which will be described later.

Figure 3:
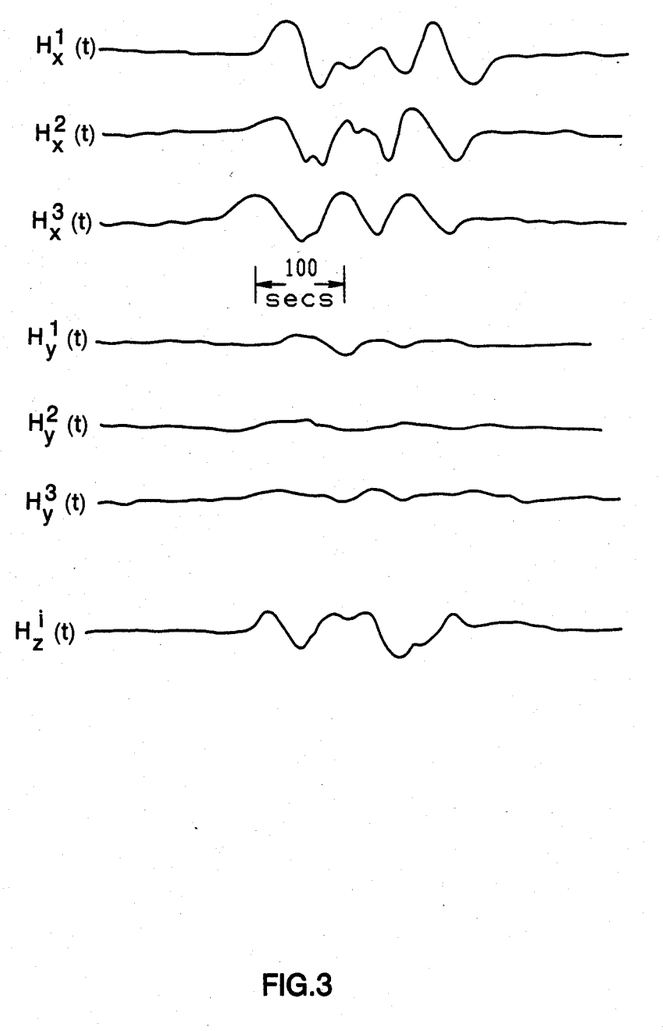
FIG. 3 is a graphical representation of magnetic field time series.

FIG. 3 depicts time series records $\vec{H}(t)$ for an electromagnetic fluctuation event. For this example, the dominant period of the event is 100 secs as indicated in FIG. 3, and the magnetic field is polarized predominantly in the x direction of FIG. 2. An ensemble of such events recorded at the three reference sites (1,2,3) and at the exploratory sites i comprises the raw data for this method. Within the ensemble of events it is desirable to include a broad range of frequencies $\omega$ and a sampling of magnetic field polarizations. Typically, the lowest frequency of naturally occurring magnetic fields, which are of interest in geophysical exploration, have a period of 1000 seconds. To monitor several cycles at this period requires concurrently recording the horizontal components of the magnetic fields at each reference site and the vertical component of the field at each exploratory site for 2-3 hours.

The vertical component of the Fourier transformed magnetic field $H_z(\omega)$ at each exploratory site can be linearly related to a regional magnetic field and regional magnetic field gradients according to:

$$H_z(\omega) \cong a_x <H_x(\omega)> + a_y <H_y(\omega)> + \quad (2)$$

$$a_{xx} <\frac{\delta H_x}{\delta x}(\omega)> + a_{yy} <\frac{\delta H_y}{\delta y}(\omega)> +$$

$$a_{xy} <\frac{\delta H_x}{\delta y}(\omega) + \frac{\delta H_y}{\delta x}(\omega)>>$$

plus higher order terms which can be truncated. In equation (2), $<H_x(\omega)>$ and $<H_y(\omega)>$ are estimates of the orthogonal, horizontal components of a regional magnetic field $<\vec{H}(\omega)>$ and $$<\frac{\delta H_x}{\delta x}(\omega)>, <\frac{\delta H_y}{\delta y}(\omega)>, <\frac{\delta H_x}{\delta y}(\omega) + \frac{\delta H_y}{\delta x}(\omega)>$$

are estimates of the horizontal gradients of the regional magnetic field. The regional magnetic field and the regional field gradient estimates are determined for each exploratory site i as further described below. The $\alpha$'s are frequency dependent transfer coefficients which are specific to the exploratory site at which the vertical component of the magnetic field $H_z(\omega)$ is being measured. In other words, $\alpha_x = \alpha_x(X_i, Y_i, \omega)$ and similarly for the other $\alpha$'s. The transfer coefficients $\alpha$ measured at a particular exploratory site can be considered as samples of continuous functions $\alpha(X, Y, \omega)$.

The horizontal components of the regional magnetic field and field gradient estimates for each exploratory site i can be found by solving:

$$H_x(\omega) = <H_x(\omega)> + <\frac{\delta H_x}{\delta x}(\omega)> x + <\frac{\delta H_x}{\delta y}(\omega)> y \quad (3)$$

$$H_x(\omega) = <H_y(\omega)> + <\frac{\delta H_y}{\delta y}(\omega)> y + <\frac{\delta H_y}{\delta x}(\omega)> x$$

using the measured horizontal components of the magnetic field $\vec{H}(\omega)$ at the three reference sites. For example, at site 1:

$$H_x^1(\omega) = <H_x(\omega)> + <\frac{\delta H_x}{\delta x}(\omega)> (\vec{L}_{il} \cdot x) + \quad (4)$$

$$<\frac{\delta H_x}{\delta y}(\omega)> (\vec{L}_{il} \cdot y)$$

-continued $$H_y^1(\omega) = \langle H_y(\omega)\rangle + \langle \frac{\delta H_y}{\delta x}(\omega)\rangle (\vec{L}_{ij} \cdot \vec{x}) + \langle \frac{\delta H_y}{\delta y}(\omega)\rangle (\vec{L}_{ij} \cdot \vec{y})$$

where, as indicated in FIG. 2, $\vec{L}_{ij}$ is the position vector of reference site j with respect to exploratory site i; and x and y are unit vectors in the $\hat{x}$ and $\hat{y}$ directions. Equation (4) along with similar equations for reference sites 2 and 3 comprise a system of six equations in the six unknowns:

$$\langle H_x(\omega)\rangle, \langle H_y(\omega)\rangle, \langle \frac{\delta H_x}{\delta x}(\omega)\rangle,$$

$$\langle \frac{\delta H_y}{\delta y}(\omega)\rangle, \langle \frac{\delta H_x}{\delta y}(\omega)\rangle \text{and} \langle \frac{\delta H_y}{\delta x}(\omega)\rangle.$$

In general, the absence of a vertical component of electric current flowing through the earth-air interface enforces the condition $\delta H_x/\delta y - \delta H_y/\delta x = 0$. This condition can be applied in the form $$\langle \frac{\delta H_x}{\delta y}(\omega)\rangle - \langle \frac{\delta H_y}{\delta x}(\omega)\rangle = 0 \qquad (5)$$

in place of one of the equations (4) to insure that the regional magnetic field estimate is curl free. Alternatively, equation (5) and all of equations (4) can be solved using a least squares technique.

The coefficients $\alpha_x$ and $\alpha_y$ describe the interaction of the regional horizontal magnetic field with a two- or three-dimensional earth resistivity structure. The coefficients $\alpha_{xx}$, $\alpha_{yy}$ and $\alpha_{xy}$ describe the interaction of the regional field gradients with a one-, two- or three-dimensional earth resistivity structure. In general, all five transfer coefficients $\alpha$ are nonzero for a three-dimensional earth resistivity structure; however, in one- and two-dimensional cases, symmetry reduces the number of nonzero solutions as follows:

1-D Case: (7)

$$\alpha_x = \alpha_y = \alpha_{xy} = 0; \alpha_{xx} = \alpha_{yy} = \alpha$$

$$H_z(\omega) = \alpha \left[ \langle \frac{\delta H_x}{\delta x}(\omega)\rangle + \langle \frac{\delta H_y}{\delta y}(\omega)\rangle \right]$$

$$\alpha_y = \alpha_{xy} = 0; \alpha_{xx} \neq \alpha_{yy}; \alpha_x \neq 0 \qquad (8)$$

$$H_z(\omega) = \alpha_x \langle H_x(\omega)\rangle + \alpha_{xx} \langle \frac{\delta H_x}{\delta x}(\omega)\rangle + \alpha_{yy} \langle \frac{\delta H_y}{\delta y}(\omega)\rangle$$

here y is the coordinate parallel to the strike of the formation.

An important consideration in applying this method concerns the relative magnitude of:

(1) $\delta$, the magnetic field penetration depth into the earth;

(2) L, the spacing between reference sites 1, 2, 3 and the exploratory sites i;

(3) $\lambda$, the spatial wavelength of the naturally occurring electromagnetic fluctuations.

Figure 4:
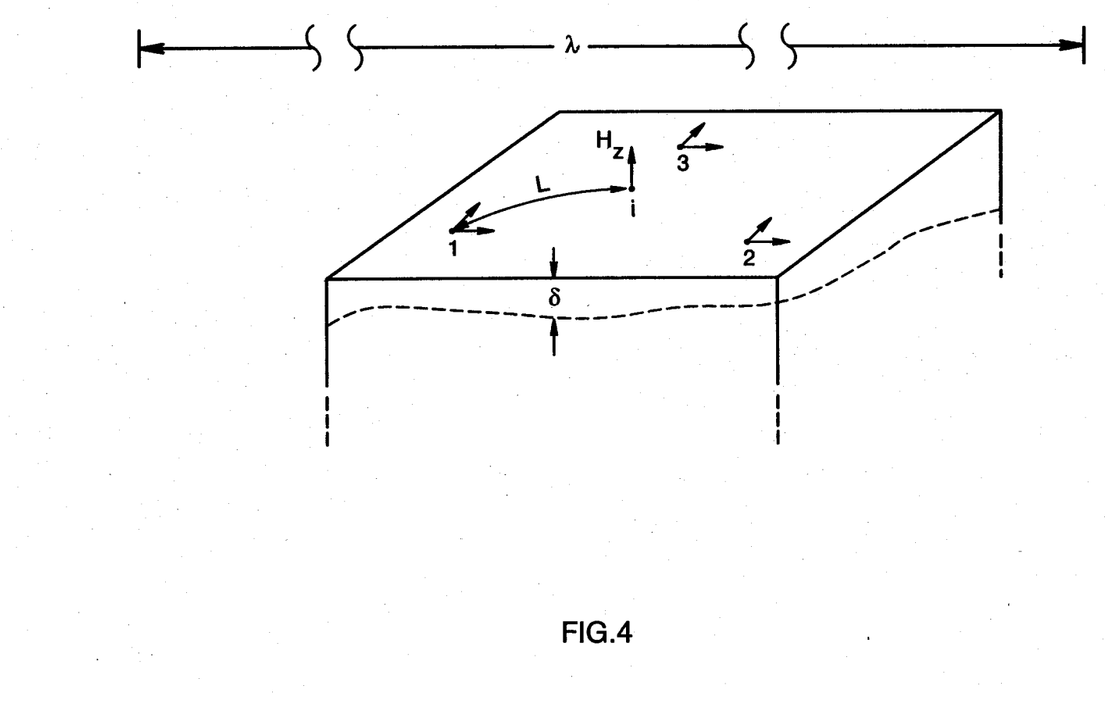
FIG. 4 is a representation of a magnetometer array in perspective view.

The relation of these measures ($\delta$, L, $\lambda$) is depicted schematically in FIG. 4.

It is understood that if the truncated expression in Equation (2) is to adequately describe the vertical component of the magnetic field $H_z(\omega)$ the horizontal components of the regional magnetic field and $\langle H_x(\omega)\rangle$ and $\langle H_y(\omega)\rangle$ must be slowly varying in relation to the spacing L. L generally defines the diameter of the region of interest R where Equation (2) is valid. This requires that $\lambda >> L$. On the other hand, over 2-D or 3-D earth resistivity structures, an estimate of the regional field gradient over a spacing comparable with $\delta$ may result in a regional field gradient estimate which is highly correlated with the regional horizontal field. To obtain a useful regional field gradient estimate demands $\delta << L$. Altogether, it is desirable that $\delta << L << \lambda$, i.e., L is at least 3$\delta$ and $\lambda$ is at least 3L. For exploration purposes where $\delta$ is of order 10 km at most, this condition can be met because $\lambda$ is typically greater than several hundred km. A choice of L about 100 km is an appropriate choice for deep investigations employing electromagnetic field frequencies in the period range from 1 to 1000 seconds, corresponding to field penetration depths $\delta$ from about 1 to 50 km in a 10 ohm-m earth.

Figure 5:
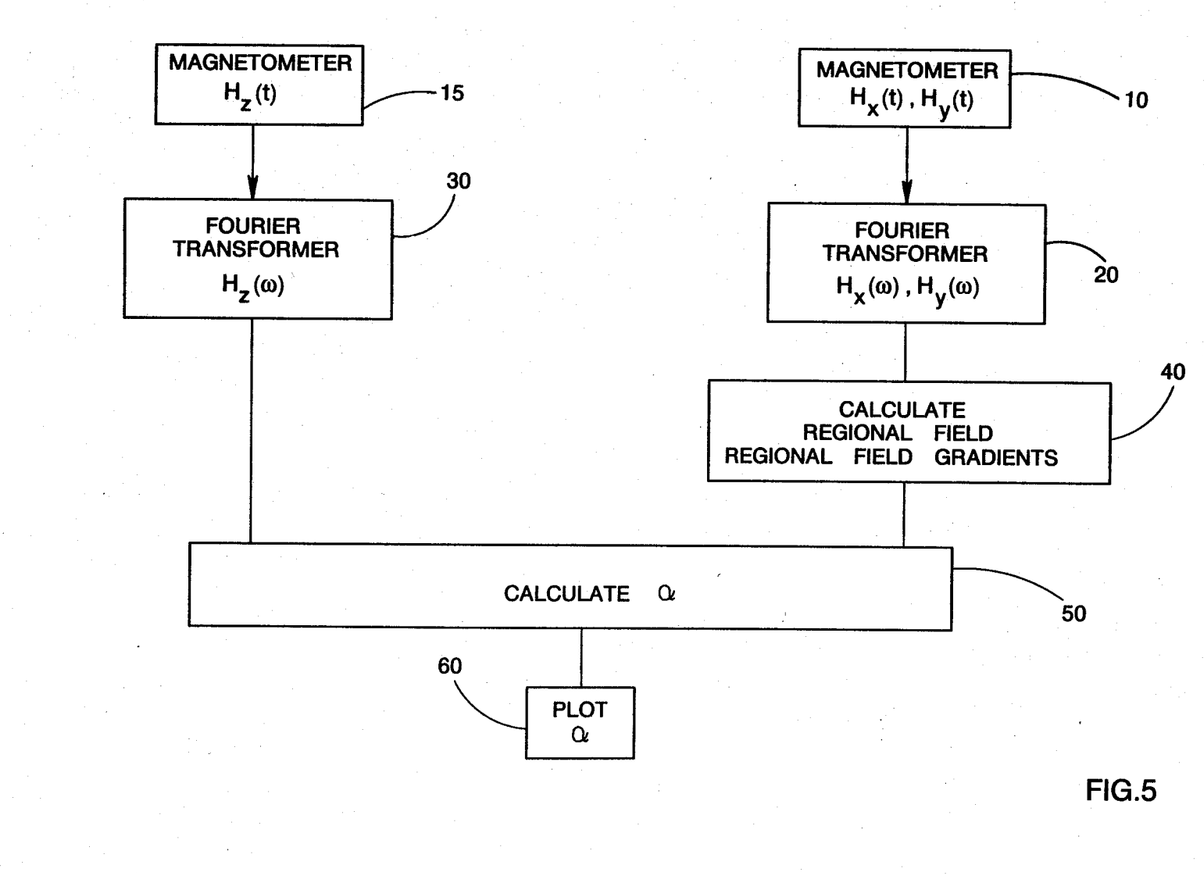
FIG. 5 is a processing flow diagram of the method of the present invention.

Looking now at FIG. 5, a processing flow diagram of the method of the present invention is illustrated. The horizontal components of the earth's magnetic field are measured at a plurality of reference sites defining a region of interest R by magnetometers 10. Simultaneously, the vertical component of the earth's magnetic field are measured at a plurality of exploratory sites within the region of interest R by magnetometers 15. The horizontal components of the magnetic field measured by magnetometers 10 are provided to Fourier Transformer 20 to compute the frequency dependent horizontal components of the magnetic field, i.e., $H_x(\omega)$ and $H_y(\omega)$. The measured vertical component of the magnetic field from 15 is also provided to Fourier Transformer 30 to compute the frequency dependent vertical component of the magnetic field $H_z(\omega)$. The horizontal components of the magnetic field from 20, are provided to calculator 40 to obtain a measure of the regional magnetic field and the regional field gradients according to Equations (3).

The frequency dependent components of the vertical magnetic field from 30 and the regional magnetic field and the regional gradient from 40 are provided to calculator 50 to obtain a measure of the transfer coefficients $\alpha$ according to Equation (2) by standard linear regression analysis.

The transfer coefficients, $\alpha$ which are generally functions of exploratory site location and frequency, are provided to plotter 60 which can display the transfer coefficients as a sequence of fixed frequency maps, e.g., $\alpha(X, Y, \omega_k)$ for a set of desired frequencies, $\omega_k$. Alternately, the transfer coefficients may be displayed as functions of one spatial coordinate and frequency if the exploratory sites lie along a survey line, e.g., $\alpha(X_i, \omega)$ where $X_i$ is the position along the survey line.

Figure 6:
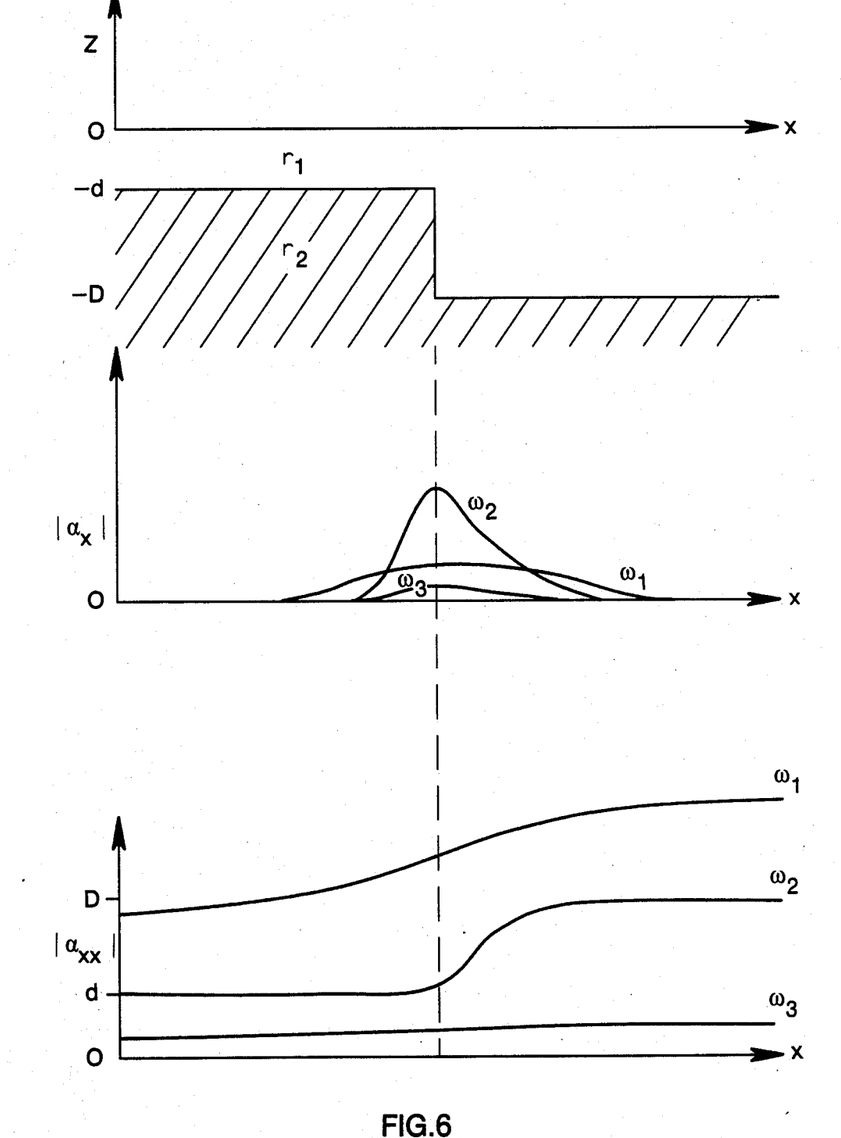
FIG. 6 is a two-dimensional earth resistivity structure, and displays of measurements of such resistivity structure are provided in accordance with the present invention.

As an example of the interpretation of the transfer coefficients $\alpha$, consider the response of a 2-D earth resistivity structure depicted in FIG. 6. Here, a first layer having resistivity $r_1$ overlays a stepped second layer having a resistivity $r_2$. Measurements are carried out at exploratory sites located along a survey line running across the structure, perpendicular to strike. The remotely located reference sites are not shown in the figure. Designating the survey line direction as X and the strike direction as Y, the non-zero transfer coefficients are, from Eqn. (7), $\alpha_x(X, \omega)$, $\alpha_{xx}(X, \omega)$ and $\alpha_{yy}(X, \omega)$. Because the structure is 2-D, these coefficients are independent of Y. The magnitudes of $\alpha_x$ and $\alpha_{xx}$ are schematically shown in FIG. 6 for three frequencies $\omega_1 < \omega_2 < \omega_3$. The responses shown correspond to the case when $r_1 > r_2$. At the highest frequency, $\omega_3$, the magnetic field penetration is limited to the first layer; at the intermediate frequency, $\omega_2$, the field penetrates the first layer but not the less resistive second layer, at the lowest frequency, $\omega_1$, the field has penetrated into the second layer. The transfer coefficient $\alpha_x$, which is dimensionless, serves to indicate departures from a 1-D condition and to identify those frequencies at which there are rapid lateral variations in field penetration depth. The coefficient $\alpha_{xx}$, which has the dimensions of length, gives a measure of the local field penetration depth; the rate of change of $\alpha_{xx}$ with frequency indicates the resistivity at the depth of magnetic field penetration. Although not shown, the behavior of the transfer coefficient $\alpha_{yy}$ is similar to $\alpha_{xx}$. Referring back to FIG. 1, it should be noted that if a similar near-surface anomaly were present in the model depicted in FIG. 6, a magnetotelluric interpretation inproximity to the near-surface anomaly would yield resistivity structure estimates which are grossly in error, while the magnetic field interpretation would be unaffected if current induction in the near surface anomaly is not significant (i.e., at low frequencies). For a three dimensional earth resistivity structure, the transfer coefficients $\alpha_{xx}$, $\alpha_{yy}$ and $\alpha_{xy}$ would also convey the same information as the transfer coefficients $\alpha_{xx}$ and $\alpha_{yy}$ for the two-dimensional earth resistivity structure depicted in FIG. 6.

While the three reference sites described above define the preferred magnetometer array, other configurations are possible. The simultaneous measurement of the horizontal components of the magnetic field $\vec{H}(t)$ at as few as two fixed reference sites and the measurement of all components of the magnetic field $\vec{H}(t)$ at a noncollinearly located roving exploratory site can serve to implement the present invention. By increasing the number of reference sites, one is able to improve the estimates of the regional magnetic field and regional gradients, as well as provide an estimation of the higher order derivative terms from Equation (2) to assess their significance. Additionally, increasing the number of reference sites in the array allows for the implementation of remote reference techniques as described by T. D. Gamble, et al., "Magnetotellurics with a Remote Reference," Geophysics, 44, p. 53–68 (1979) for which at least two independent estimates of each input are required.

The present invention discloses a method which can be used to ameliorate the so-called "statics" effects which afflict magnetotelluric measurements. Through the use of the present invention, more accurate information can be obtained by the use of electromagnetic geophysical exploration techniques to increase their reliability and acceptance.

The present invention has been described by way of the preferred embodiment for illustration only and should not be limited thereto but only by the scope of the following claims.

I claim:

1. A method of electromagnetic exploration comprising the following steps:

(a) obtaining measures of two horizontal components of the earth's magnetic field at each of a plurality of reference sites;
   (b) obtaining a measure of the vertical component of the earth's magnetic field for at least one exploratory site; and
   (c) determining a measure of a multidimensional earth resistivity structure by correlating the measures of horizontal and vertical components of the earth's magnetic field.

2. The method of claim 1 wherein at least three reference sites are employed to obtain a measure of the horizontal components of the earth's magnetic field.

3. The method of claim 1 wherein the spacing of reference sites from the exploratory sites, is a distance less than the wave length of the magnetic field.

4. The method of claim 1 wherein the spacing of the reference sites from the exploratory sites, is a distance greater than the depth of investigation into the earth's subterranean formations.

5. The method of claim 1 wherein the steps of determining a measure of a multidimensional earth resistivity structure includes:

(a) obtaining a measure of a regional magnetic field from the measures of the horizontal components of the earth's magnetic field obtained at a plurality of reference sites;
   (b) obtaining a measure of regional field gradients from the measures of the horizontal components of the earth's magnetic field obtained at a plurality of reference sites; and
   (c) simultaneously Fourier transforming the regional horizontal magnetic field and field gradient measurements with the measurements of the vertical component of the magnetic field to obtain a measure of a multidimensional earth resistivity structure.

6. The method of claim 1 wherein the step (c) comprises correlating the regional magnetic field and field gradient measurements with the measurements of the vertical component of the magnetic field according to:

$$H_z(\omega) = \alpha_x <H_x(\omega)> + \alpha_y <H_y(\omega)> +$$
$$\alpha_{xx} <\frac{\delta H_y}{\delta x}(\omega)> + \alpha_{yy} <\frac{\delta H_y}{\delta y}(\omega)> +$$
$$\alpha_{xy} <\frac{\delta H_x}{\delta y}(\omega) + \frac{\delta H_y}{\delta x}(\omega)>$$

where $<H_x(\omega)>$ and $<H_y(\omega)>$ are measures of the horizontal components of the regional magnetic field;

$$<\frac{\delta H_y}{\delta y}(\omega)>, <\frac{\delta H_x}{\delta x}(\omega)> \text{ and } <\frac{\delta H_x}{\delta y}(\omega) + \frac{\delta H_y}{\delta x}(\omega)>$$

are measures of the field gradients; and $\alpha$'s are transfer coefficients providing a multidimensional measure of the earth's resistivity structure.

7. The method of claim 1 further including the step of plotting the measures of the multidimensional earth resistivity structure.

8. The method of claim 1 wherein:

as few as two fixed reference sites are employed to obtain a measure of the horizontal components of the earth's magnetic field; and the measurements of the vertical and horizontal components of the earth's magnetic field are at exploratory sites noncollinear with the fixed two reference sites.

9. The method of claim 6 wherein the transfer coefficients $\alpha_x$ and $\alpha_y$ provide a measure of the departure of the earth resistivity structure from a one dimensional condition.

10. The method of claim 6 wherein the transfer coefficients $\alpha_{xx}$, $\alpha_{yy}$ and $\alpha_{xy}$ provide a measure of the magnetic field penetration depth.

11. The method of claim 10 wherein the rate of change of transfer coefficients $\alpha_{xx}$, $\alpha_{yy}$ and $\alpha_{xy}$ with frequency provides a measure of the earth's resistivity at the magnetic field penetration depth.

12. The method of claim 6 further including plotting the magnitude of the transfer coefficient $\alpha_x$ and $\alpha_y$ as a function of location and frequency.

13. The method of claim 6 further including plotting the magnitude of the transfer coefficient $\alpha_{xx}$ and $\alpha_{yy}$ as a function of location and frequency.

* * * * *

UNITED STATES PATENT OFFICE
CERTIFICATE OF CORRECTION

PATENT NO. : 4,663,593

DATED : May 5, 1987

INVENTOR(S) : Anthony G. Nekut, Jr.

It is certified that error appears in the above-identified patent and that said Letters Patent are hereby corrected as shown below:

Column 4, line 29 (formula 2), remove one of ">" at end of formula #2; line 64 (formula 4), "$(\vec{L}_{il} \cdot x)$" should read "$(\vec{L}_{il} \cdot \hat{x})$"; line 67 (formula 4), "$(\vec{L}_{il} \cdot y)$" should read "$(\vec{L}_{il} \cdot \hat{y})$".

Column 5, line 3 (formula 4), "$(\vec{L}_{il} \cdot x)$" should read "$(\vec{L}_{il} \cdot \hat{x})$"; line 5 (formula 4), "$(\vec{L}_{il} \cdot y)$" should read "$(\vec{L}_{il} \cdot \hat{y})$"; line 10, "x and y" first occurrence, should be "$\hat{x}$ and $\hat{y}$"; second occurrence "$\hat{x}$ and $\hat{y}$" should be "x and y"; line 51, prior to formula #8, insert "2-D Case: "

Column 7, line 1, "X" should read "$\hat{X}$"; line 2, "Y" should read "$\hat{Y}$".

Signed and Sealed this

Thirtieth Day of August, 1988

Attest:

DONALD J. QUIGG

*Attesting Officer*     *Commissioner of Patents and Trademarks*